J. M. AGUAYO.
PROCESS OF PRESERVING MILK.
APPLICATION FILED JUNE 24, 1911.
1,007,046.
Patented Oct. 31, 1911.
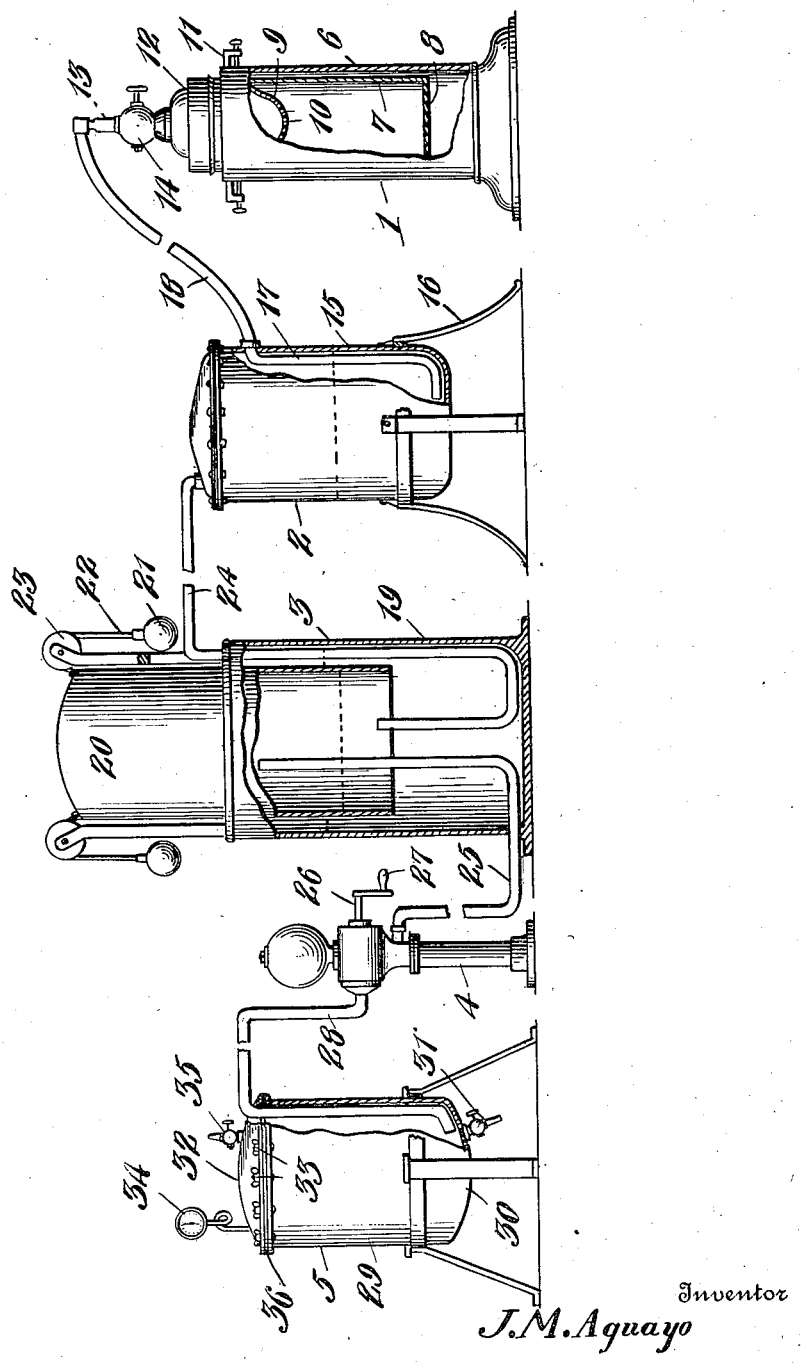
Witnesses
Chas. L. Griesbauer
L. G. Ellis.
Inventor
J. M. Aguayo
By Watson E. Coleman.
Attorney

UNITED STATES PATENT OFFICE.

JOSÉ M. AGUAYO, OF ARTAMISA, CUBA.

PROCESS OF PRESERVING MILK.

1,007,046.  Specification of Letters Patent.  Patented Oct. 31, 1911.

Application filed June 24, 1911. Serial No. 635,138.

*To all whom it may concern:*

Be it known that I, JOSÉ M. AGUAYO, a citizen of the Republic of Cuba, residing at Artamisa, in the Province of Pinar del Rio, Republic of Cuba, have invented certain new and useful Improvements in Processes of Preserving Milk, of which the following is a specification, reference being had to the accompanying drawings.

My invention is a process for preserving milk in its natural state free from fermentation for an indefinite period of time and consists essentially in subjecting the milk while fresh to the action of oxygen gas under pressure and in a container from which air is excluded, as hereinafter described and claimed.

The accompanying drawing is a figure illustrating one form of apparatus in which my improved process may be carried out.

For the purposes of this specification and to enable my process to be readily understood I herein show an oxygen gas generator at 1, a gas washer at 2, a gasometer at 3, a force pump at 4 and an oxygenator for supplying oxygen gas, under pressure, to the milk, at 5. The gas generator comprises an iron cylinder 6 which, when in use, is filled about two-thirds full of water. In the cylinder 6 is an interior cylinder 7 which terminates short of the bottom of the cylinder 6 and is provided with a perforated diaphragm 8 on which oxalate cubes are placed. A filter 9 which comprises a substantially semi-spherical perforated body 10 filled with cotton or other like filtering material is connected hermetically to the upper, open ends of the cylinders 6 and 7 by means of suitable clamps 11. This filter has its cap or top provided with an escape pipe 13 which has a valve 14.

The washer 2 is a closed vessel 15 here shown as provided with supporting legs 16 and to the lower portion of which leads an intake pipe 17 which discharges at the bottom of a column of water containing enough caustic potash to make a six per cent. solution. A hose or other suitable pipe 18 connects the discharge pipe 13 of the gas generator with the intake pipe 17 of the gas washer and it will be understood that the gas produced and discharged by the generator is forced therefrom through the pipe 17 and discharged at the bottom of the column of solution in the washer and bubbles up through the said column of solution and hence is washed thereby.

The gasometer 3 is of the usual type and is here shown as comprising an outer vessel 19 and the gas bell 20 which is movable vertically therein and is partly counterbalanced by weights 21 connected thereto by cords 22, which cords pass over direction pulleys 23. The vessel 19 is partly filled with water and the lower end of the gas bell is sealed by the column of water. A pipe 24 leads from the gas washer 2 and discharges under the bell. A gas discharge pipe 25 leads from the gas space in the bell and is connected to the force pump 4 which is here indicated as of the rotary type, the operating shaft being shown at 26 and the crank handle thereof at 27. A pipe 28 leads from the pump and discharges in the bottom of the oxygenator 5 which is here shown as a cast iron cylinder 29 of great strength, provided with a funnel shaped bottom 30 having a discharge valve 31, the cylinder being further provided with a cover 32 detachably secured in place by means of clamps 33 and provided with a pressure gage 34 and an air discharge valve 35.

In carrying out my improved process, assuming that the apparatus is charged with oxygen gas and ready for operation, the milk, fresh from the cow, is placed in the oxygenator 5, the cover of which is then hermetically sealed, a rubber gasket 36 being here indicated for this purpose. It is to be assumed that the discharge valve 31 is closed. The valve 35 is then opened and the pump operated, thereby causing oxygen gas to be discharged up through the column of milk in the oxygenator and from the oxygenator through the valve pipe 35, thereby forcing out all the air from the oxygenator. The valve 35 is then closed and the operation of the pump is continued, thus causing the milk to be confined, together with the oxygen gas, in the oxygenator, and excluded from the air and the pumping is continued until the pressure of the oxygen gas, to the action of which the milk is subjected, reaches five or six atmospheres. The milk is maintained in this condition and under this pressure for a period of from four to five hours. At the expiration of this time, by means of the valve 35 the pressure of the oxygen gas is reduced to about two atmospheres. At this pressure the milk is discharged from the oxygenator by means of the valve 31 or suitable apparatus into the cans or vessels in which the milk is to be stored for distribution and use, care being exercised to prevent loss of the gas pressure while thus filling the cans or other vessels and to maintain the milk, in the vessels, under the action of the oxygen gas at the pressure of about two atmospheres, the vessels being, of course, sealed for this purpose. Thus treated and stored the milk is, by the action of oxygen gas, preserved from fermentation. The oxygen gas is not injurious to the milk or to the user of the milk in any way.

Having thus described my invention I claim:

The process of preserving milk consisting in excluding the same from the atmosphere, subjecting the milk, while so excluded, to the action of oxygen gas at a pressure of from five to six atmospheres, maintaining the milk under the action of the oxygen gas at such pressure for a suitable period of time, then reducing the gas pressure, and thereafter continuously subjecting the milk to the action of the oxygen gas under the reduced pressure.

In testimony whereof I hereunto affix my signature in the presence of two witnesses.

JOSÉ M. AGUAYO.

Witnesses:
J. COSTA,
C. STEWARD O'NEILL.